(12) United States Patent
Lee et al.

(10) Patent No.: US 8,306,538 B2
(45) Date of Patent: Nov. 6, 2012

(54) APPARATUS AND METHOD OF PERFORMING MEASUREMENTS LOGGING IN WIRELESS COMMUNICATION SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 13/082,670

(22) Filed: Apr. 8, 2011

(65) Prior Publication Data

US 2011/0250893 A1    Oct. 13, 2011

Related U.S. Application Data

(60) Provisional application No. 61/322,907, filed on Apr. 11, 2010, provisional application No. 61/323,320, filed on Apr. 12, 2010.

(51) Int. Cl.
*H04W 88/02* (2009.01)
(52) U.S. Cl. ........................................................ 455/436
(58) Field of Classification Search ........... 455/436–453
See application file for complete search history.

(56) References Cited

U.S. PATENT DOCUMENTS

| 7,867,620 | B1 * | 1/2011 | Yao et al. ............ 428/450 |
| 2006/0182062 | A1 | 8/2006 | Sdralia et al. |
| 2009/0239536 | A1 | 9/2009 | Fallgren et al. |
| 2010/0279679 | A1 * | 11/2010 | Young et al. ............ 455/423 |
| 2011/0183662 | A1 * | 7/2011 | Lee et al. ............ 455/422.1 |
| 2011/0319115 | A1 * | 12/2011 | Racz ............ 455/514 |
| 2012/0052856 | A1 * | 3/2012 | Wu ............ 455/422.1 |
| 2012/0108241 | A1 * | 5/2012 | Wu ............ 455/436 |
| 2012/0113837 | A1 * | 5/2012 | Siomina et al. ............ 370/252 |
| 2012/0190364 | A1 * | 7/2012 | Wu ............ 455/436 |

OTHER PUBLICATIONS

Vodafone, "Mechanisms for Delayed Reporting in Connected Mode," 3GPP TSG RAN WG2 #69, R2-101297, Feb. 22-26, 2010, pp. 1-5.

* cited by examiner

*Primary Examiner* — Diane Mizrahi
(74) *Attorney, Agent, or Firm* — Birch, Stewart, Kolasch & Birch, LLP

(57) ABSTRACT

A method and apparatus of performing measurements logging in a mobile communications system is provided. A user equipment receives a first measurement request message from a first cell and receives a handover command message. Upon receiving the handover command message, the user equipment stops a transmission of a response to the first measurement request message.

10 Claims, 8 Drawing Sheets

APPARATUS AND METHOD OF PERFORMING MEASUREMENTS LOGGING IN WIRELESS COMMUNICATION SYSTEM

CROSS-REFERENCE TO RELATED APPLICATIONS

This application claims the benefit of priority of U.S. Provisional applications 61/322,907 filed on Apr. 11, 2010, and 61/323,320 filed on Apr. 12, 2010, all of which are incorporated by reference in their entirety herein.

BACKGROUND OF THE INVENTION

1. Field of the Invention

The present invention relates to wireless communications, and more particularly, to a method and apparatus for performing measurements logging in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by service providers for coverage optimization by using a user equipment (UE) instead of using an automobile. A coverage varies depending on a location of a base station (BS), deployment of buildings nearby, a user's usage environment, etc. Therefore, it is required for the service providers to periodically perform the driving test, and a lot of costs and resources are consumed. The MDT is used when the service provider measures the coverage by using the UE.

In general, when the UE moves from one cell to another cell, the UE performs uplink transmission continuously from a previous cell to a next cell while the UE is moving. However, since a certain cell does not support the MDT, there may be a problem in that the UE unnecessarily transmits an MDT measurement result to a cell that does not support the MDT.

SUMMARY OF THE INVENTION

In an aspect, a user equipment (UE) configured to perform measurements logging in a mobile communications system is provided. The UE includes a transceiver configured to transmit and receive data, and a controller operatively connected to the transceiver and configured to receive a first measurement request message from a first cell, receive a handover command message commanding the UE to handover from the first cell to a second cell, and upon receiving the handover command message, stop a transmission of a response to the first measurement request message.

The controller may be configured to perform handover from the first cell to the second cell, receive a second measurement request message from the second cell, and transmit a response to the second measurement request message.

The first measurement request message may include a first request for performing minimization of drive tests (MDT).

The second measurement request message may include a second request for performing minimization of drive tests (MDT).

The first measurement request message may include at least one of a logging interval indicating a periodicity for storing a measurement result, a reference time indicating when to send a logged measurement report, and an area configuration indicating an area for performing measurement logging.

The controller may be configured to log a measurement after receiving a first measurement request message.

The measurement may be logged in a radio resource control (RRC) idle mode.

In another aspect, a method of measuring by user equipment (UE) configured to perform measurements logging in a mobile communications system is provided. The method includes receiving, by the UE, a first measurement request message from a first cell, receiving, by the UE, a handover command message, and upon receiving the handover command message, stopping a transmission of a response by the UE to the first measurement request message.

DESCRIPTION OF EXEMPLARY EMBODIMENTS

Figure 1:
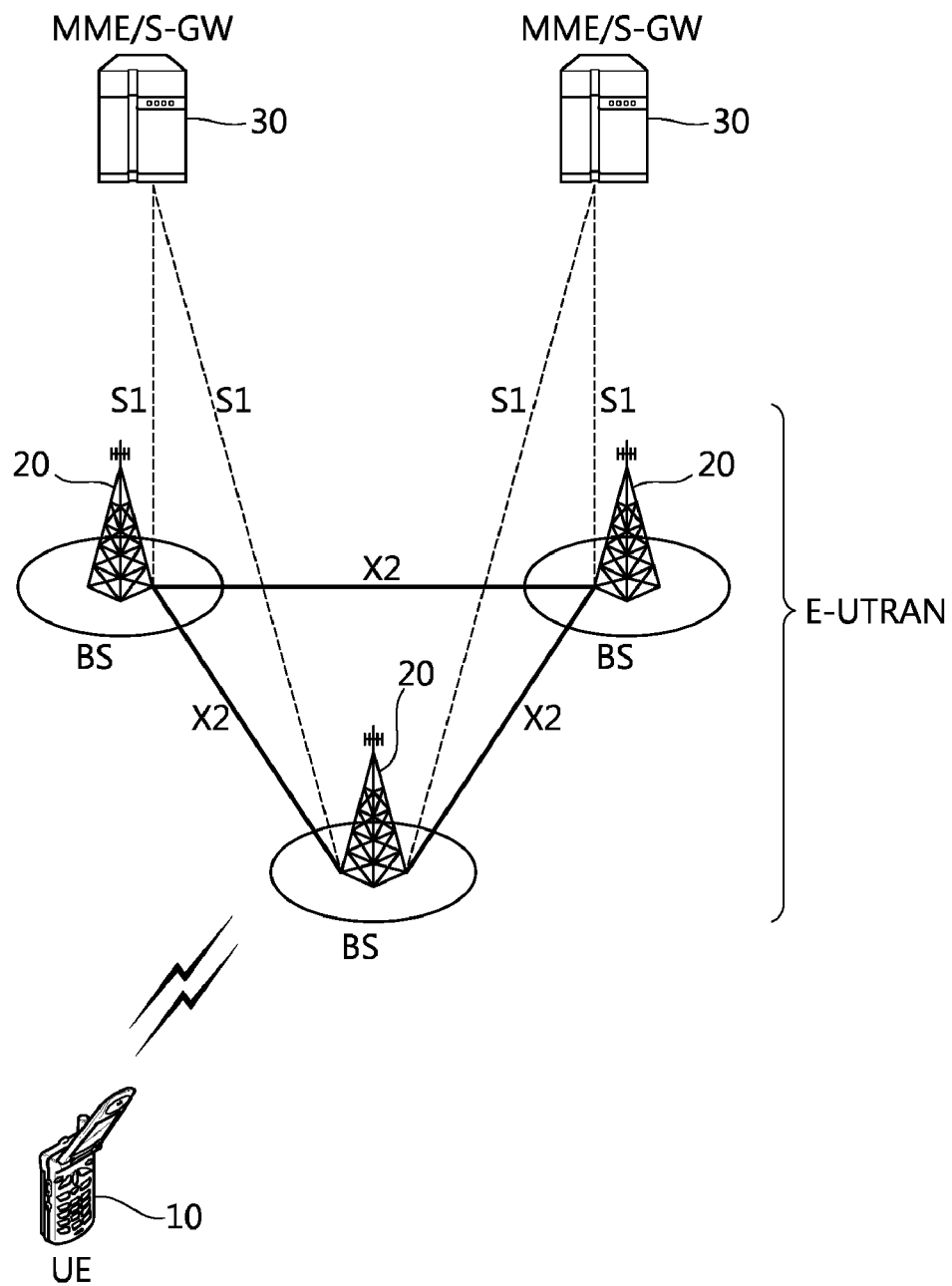
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 that provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
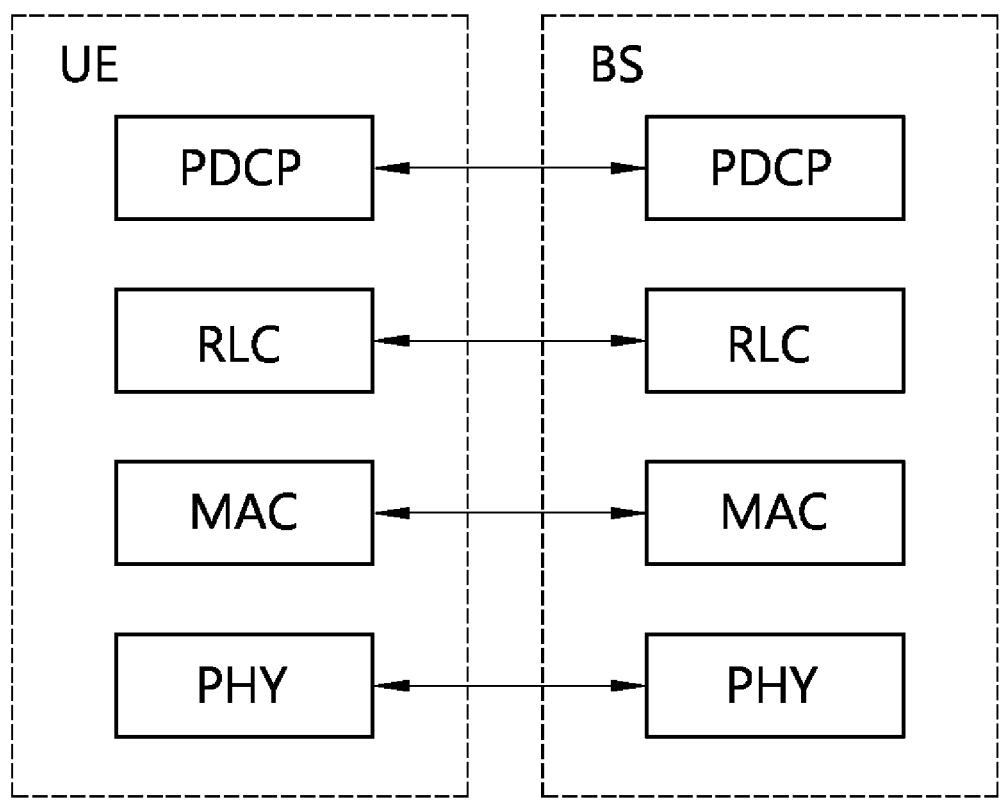
FIG. 2 is a diagram showing a radio protocol architecture for a user plane.
Figure 3:
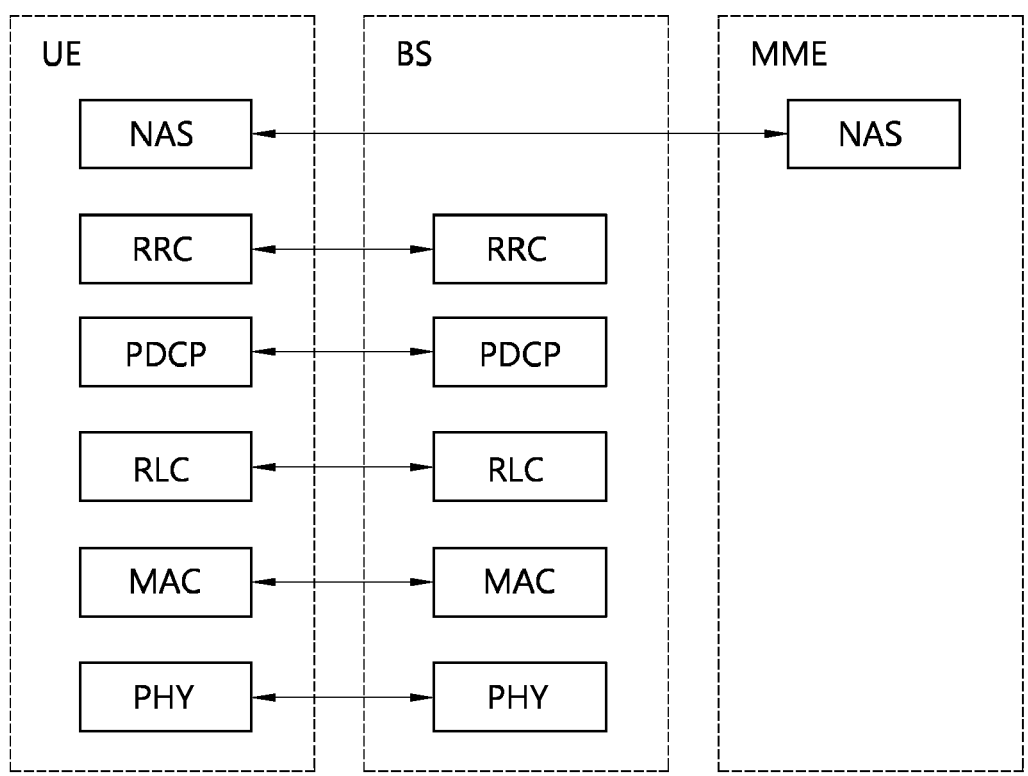
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PI-IY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (or may be called as an RRC connected mode), and otherwise the UE is in an RRC idle state (or may be called as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like. To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

Limited service: This service provides an emergency call and an earthquake and tsunami warning system (ETWS), and can be provided in an acceptable cell.

Normal service: This service denotes a public use service for general use, and can be provided in a suitable or normal cell.

Operator service: This service denotes a service for a network service provider, and a cell can be used only by the network service provider and cannot be used by a normal user.

The service type provided by a cell can be classified as follows.
1) Acceptable cell: This cell serves a UE with a limited service. This cell is not barred from the perspective of the UE, and satisfies a cell selection criterion of the UE.
2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.
3) Barred cell: Information indicating that a cell is a barred cell is broadcast in this cell by using the system information.
4) Reserved cell: Information indicating that a cell is a reserved cell is broadcast in this cell by using the system information.

Next, a procedure for measurements will be described in detail.

It is necessary for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Hereinafter, by referring to the 3GPP TS 36.304 V8.3.0 (2008-09) "User Equipment (UE) procedures in idle mode (Release 8)", a method and procedure for selecting a cell by a UE will be described in detail.

After a UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, A UE receives from a BS parameters for cell reselection.

Second, the UE measures quality of a serving cell and a neighboring cell for cell reselection.

Third, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g., cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 as shown:

$$Rs = Q\text{meas},s + Q\text{hyst}, \quad Rn = Q\text{meas},n - Q\text{offset} \qquad \text{[Equation 1]}$$

where Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranging criterion Rn of the neighboring cell are not much different from each other and constantly vary, ranking orders of the serving cell and the neighboring cell may change frequently. Thus, the serving cell and the neighboring cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as most important factor when performing the cell reselection. If a reselected cell is not a suitable cell, the UE excludes the reselected cell or a frequency of the reselected cell from targets of the cell reselection.

Figure 4:
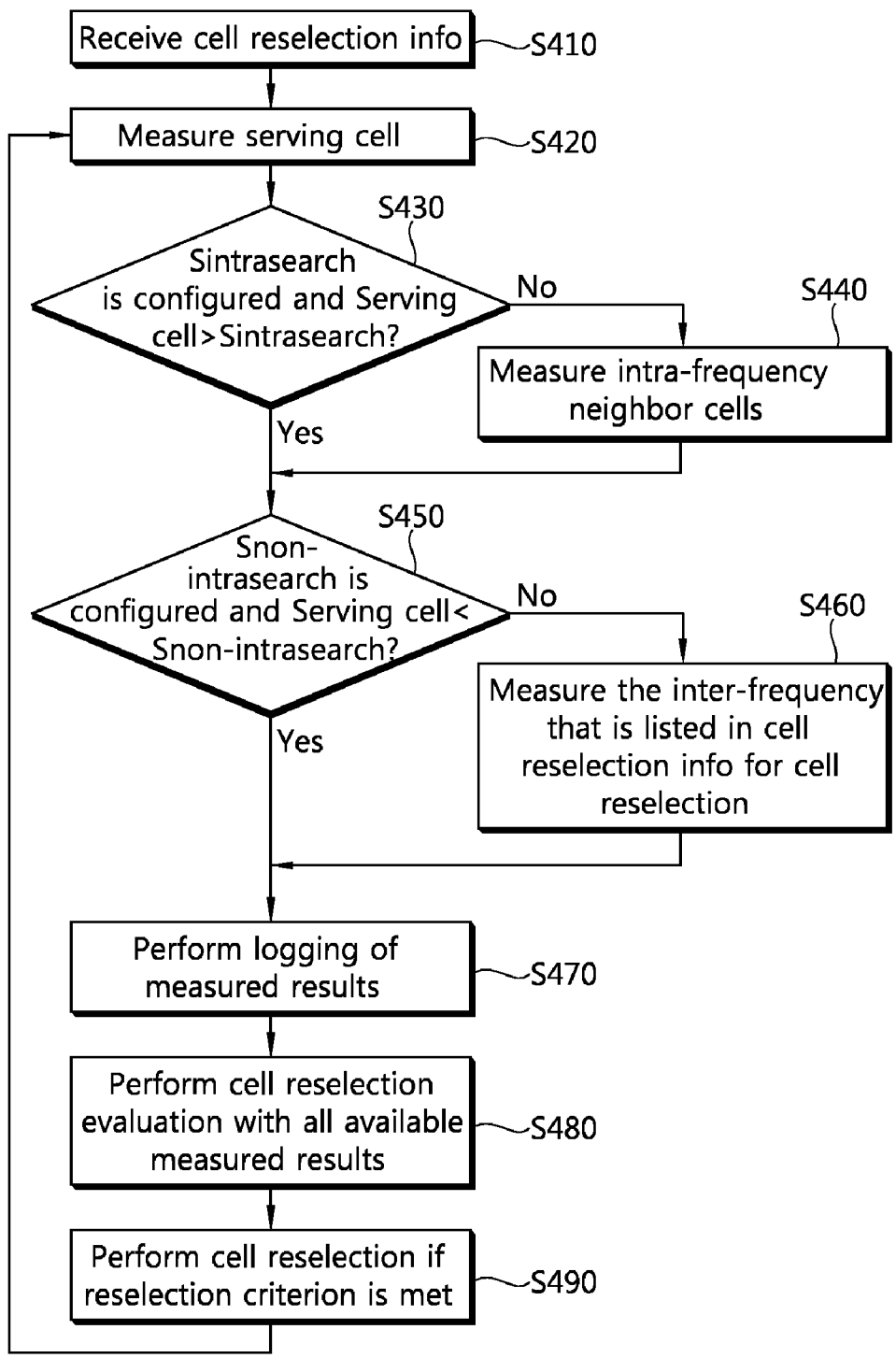
FIG. 4 is a flowchart showing a measurement method of a UE.

FIG. 4 is a flowchart showing a measurement method of a UE.

The UE measure neighbor cells in order to know whether there is a neighbor cell better than a serving cell and to access to the cell if such a neighbor cell exists. However, when the neighbor cells are measured persistently, it may cause power consumption of the UE. Therefore, if the serving cell has sufficiently good quality, measurement on the neighbor cells is skipped if possible so as to reduce power consumption of the UE.

The UE receives cell reselection information from a BS (step S410). The cell reselection information may include two thresholds, i.e., Sintrasearch and Snon-intrasearch.

The UE measures the serving cell (step S420). A measurement result of the serving cell is denoted by Sserve.

The UE compares Sserve and Sintrasearch (step S430). If Sserve is less than Sintrasearch, the UE performs intra-frequency measurement (step S440). Otherwise, if Sserve is greater than Sintrasearch, the UE can skip measurement on neighbor cells having the same frequency as the serving cell.

If the cell reselection information does not include Sintrasearch, the UE cannot skip the measurement on the neighbor cells having the same frequency as the serving cell.

The UE compares Sserve and Snon-intrasearch (step S450). If Sserve is greater than Snon-intrasearch, the UE performs inter-frequency measurement (step S460). That is, if the serving cell has better quality than Snon-intrasearch, the UE can skip measurement on neighbor cells having a different frequency from the serving cell.

If the cell reselection information does not include Snon-intrasearch, the UE cannot skip the measurement on the neighbor cells having a different frequency from the serving cell.

The UE logs the measurement result (step S470). The UE performs cell reselection evaluation with all available measurement results (step S480). If a reselection criterion is met, the UE performs cell reselection (step S490).

Now, minimization of driving tests (MDT) will be described.

The MDT is a test performed by service providers for coverage optimization by using a UE instead of using an automobile. A coverage varies depending on a location of a BS, deployment of buildings nearby, a user's usage environment, etc. Therefore, it is required for the service providers to periodically perform driving tests, and a lot of costs and resources are consumed. The MDT is used when the service provider measures the coverage by using the UE.

The MDT can be classified into a logged MDT and an immediate MDT. According to the logged MDT, after performing the MDT measurement, the UE delivers a logged measurement to a network available at a time of satisfying a reporting condition. According to the immediate MDT, after performing the MDT measurement, the UE delivers the measurement to the network at points in time when a configured reporting condition is satisfied. The logged MDT performs the MDT measurement in an RRC idle mode, but the immediate MDT performs the MDT measurement in an RRC connected mode.

Figure 5:
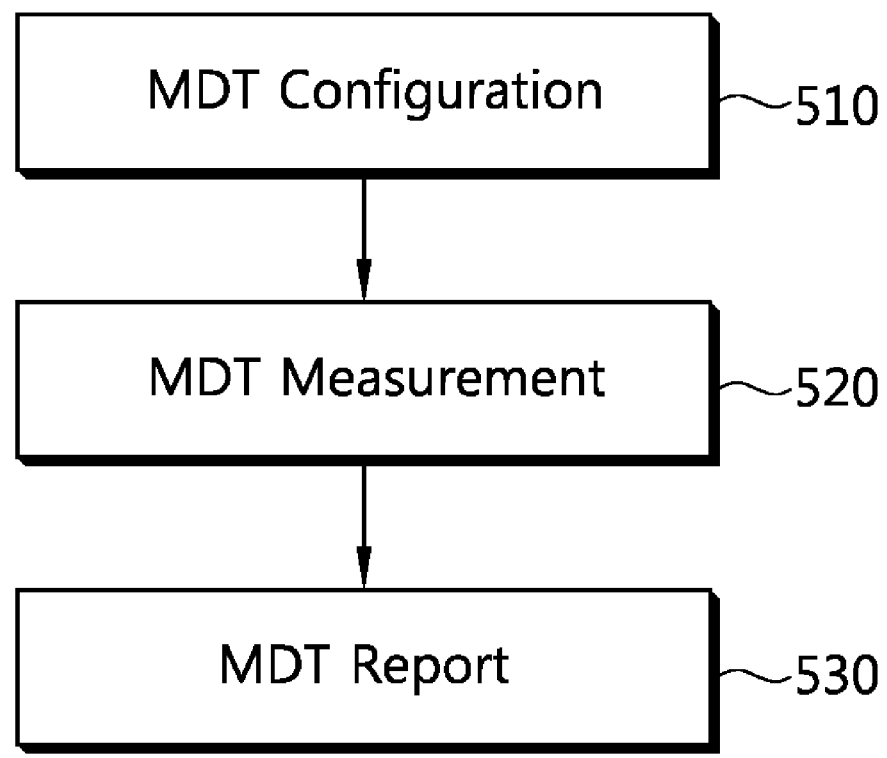
FIG. 5 shows a procedure of performing MDT.

FIG. 5 shows a procedure of performing MDT.

The MDT includes an MDT configuration 510, an MDT measurement 520, and an MDT report 530 which are performed in that order.

The MDT configuration can be transmitted from a network to a UE via a logged measurement configuration message which is an RRC message. The UE can receive the MDT configuration in an RRC connected mode. Even if the UE transitions to an RRC idle mode, the MDT configuration is kept, and thus an MDT measurement result is also kept.

The MDT configuration may include at least one of a logging interval, a reference time, and an area configuration. The logging interval indicates a periodicity for storing a measurement result. The reference time is used by the UE to echo back the reference in a logged measurement report. The area configuration indicates an area for which the UE is requested to perform logging.

The UE performs the MDT measurement based on the MDT configuration. For example, the MDT measurement is performed at every logging interval.

A measurement value may be a value well-known to those ordinary skilled in the art, such as reference signal received power (RSRP), reference signal received quality (RSRQ), received signal code power (RSCP), and Ec/No.

The UE sends to the network a logged measurement in the RRC connected mode. In the logged MDT, the UE logs the measurement in the RRC idle mode. Then, upon re-entering the RRC connected mode, the UE sends the logged measurement to the network.

The logged measurement may include at least one of measurement results of available serving cell measurements, measurement results of available neighbor cell measurements, time information, and location information.

In general, when the UE moves from one cell to another cell, the UE performs uplink transmission continuously from a previous cell to a next cell while the UE is moving. However, since a certain cell does not support the MDT, there may be a problem in that the UE unnecessarily transmits an MDT measurement result to a cell that does not support the MDT.

The problem that occurs when the UE unnecessarily transmits the MDT measurement result during a handover process is solved according to the proposed invention.

The UE stores information and receives an uplink transmission request message from a first cell. According to the uplink transmission request, the UE starts uplink transmission of the stored information. After receiving a handover command that instructs movement to a second cell, the UE stops the uplink transmission of the stored information based on the uplink transmission request.

After receiving the handover command, the UE may discard the stored information.

The stored information may include a measurement result stored by measuring quality of one or more cells by the UE in an RRC idle mode.

If the handover command indicates continuous uplink transmission, the UE may move to the second cell and then continue uplink transmission of the stored information.

The second cell transmits the handover command to the first cell. The first cell may forward the received handover command to the UE.

Figure 6:
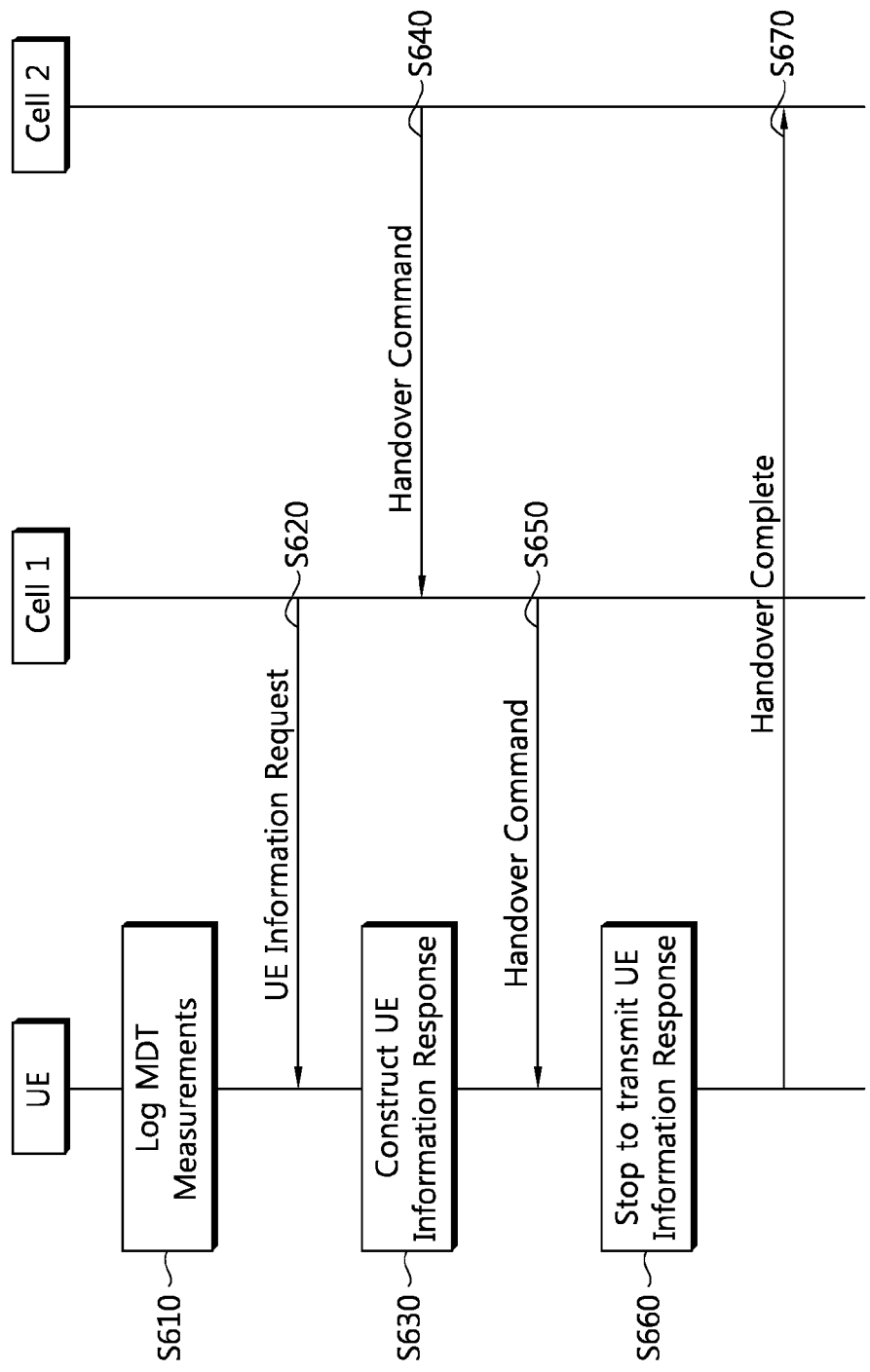
FIG. 6 is a flowchart showing a logged MDT report method according to an embodiment of the present invention.

FIG. 6 is a flowchart showing a logged MDT report method according to an embodiment of the present invention.

An UE performs an MDT measurement in an RRC idle mode, and logs an MDT measurement (step S610).

The UE establishes an RRC connection with a cell 1, and enters an RRC connection mode. The UE may report to the cell 1 that there is an logged MDT measurement while the RRC connection is established. The cell 1 transmits a UE information request to the UE to report the MDT measurement (step S620).

Upon receiving the UE information request, the UE constructs a UE information response including the logged MDT measurement (step S630). Thereafter, the UE may prepare or start transmission of the UE information response.

When a handover of the UE is determined, a cell 2 (i.e., target cell) may transmit a handover command to the cell 1 (i.e., source cell) to instruct the handover (step S640). The cell 1 transmits to the UE the handover command received from the cell 2 (step S650).

Upon receiving the handover command, the UE stops transmission of the UE information response (step S660). Then, the UE may discard the MDT configuration and/or the logged MDT measurement.

The UE transmits to the cell 2 a handover complete indicating completion of the handover (step S670). Unless the cell 2 transmits the UE information request, the UE does not transmit the UE information response to the cell 2.

Figure 7:
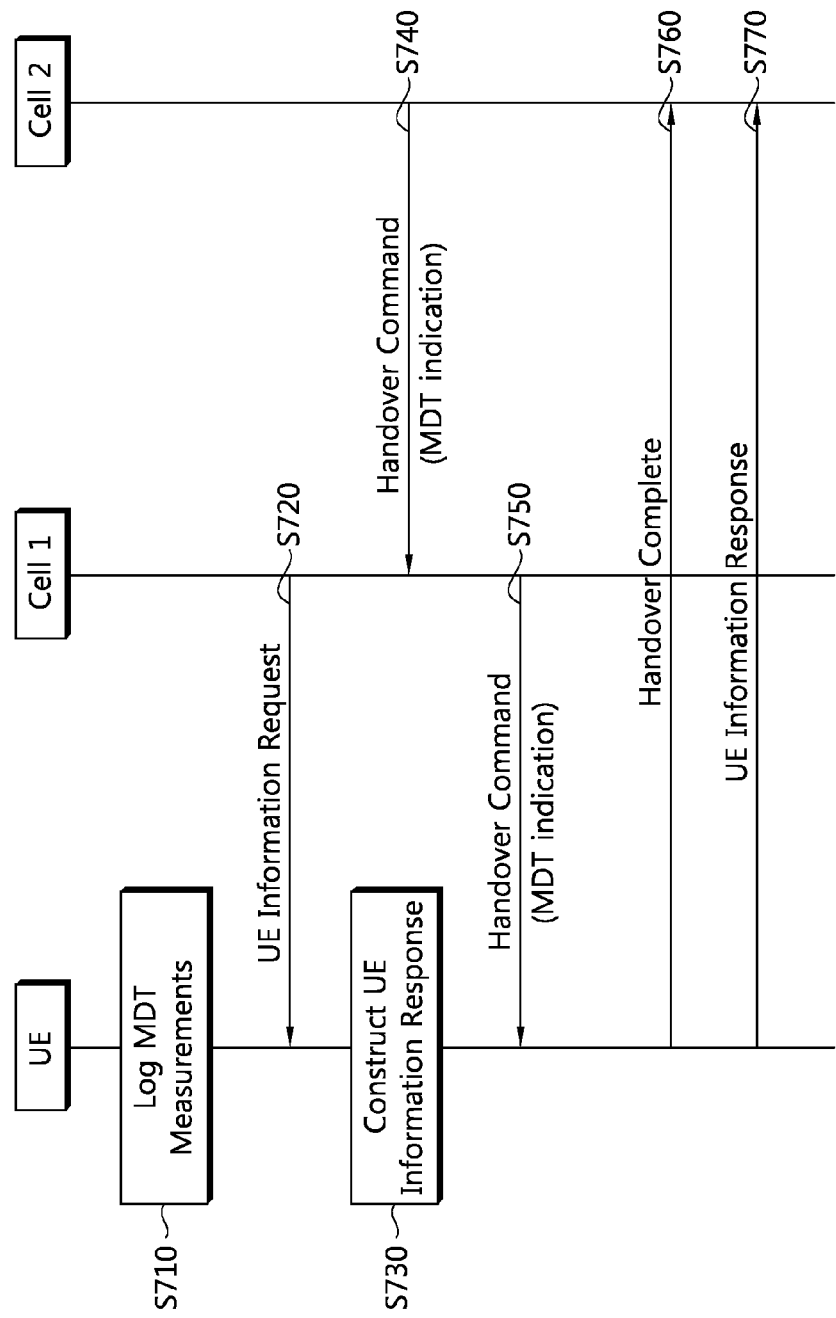
FIG. 7 is a flowchart showing a logged MDT report method according to another embodiment of the present invention.

FIG. 7 is a flowchart showing a logged MDT report method according to another embodiment of the present invention.

A UE performs an MDT measurement in an RRC idle mode, and logs an MDT measurement (step S710).

The UE establishes an RRC connection with a cell 1, and enters an RRC connection mode. The UE may report to the cell 1 that there is an logged MDT measurement while the RRC connection is established. The cell 1 transmits a UE information request to the UE to report the MDT measurement (step S720).

Upon receiving the UE information request, the UE constructs a UE information response including the logged MDT measurement (step S730). Thereafter, the UE may prepare or start transmission of the UE information response.

When a handover of the UE is determined, the cell 2 may transmit a handover command to the cell 1 (step S740). In this case, if the cell 2 supports MDT, an MDT indication may be included in the handover command. The MDT indication is information for indicating that the UE has to report the logged MDT measurement in a new cell (i.e., cell 2).

The cell 1 transmits the handover command received from the cell 2 to the UE (step S750). The handover command may include the MDT indication.

After receiving the handover command including the MDT indication, the UE transmits a handover complete to the cell 2 and thus completes the handover (step S760).

If a handover command including the MDT indication is received in a previous cell (cell 1), the UE transmits a UE information response including the logged MDT measurement in the cell 2 (step S770). Therefore, the cell 2 can acquire the logged MDT measurement.

On the other hand, if a handover command not including the MDT indication is received in the previous cell (i.e., cell 1) or if the MDT indication indicates not to report the logged MDT measurement, the UE may not perform transmission of the UE information response.

In the proposed method, the handover is performed to report the MDT measurement. The UE can be prevented from reporting the MDT measurement to the cell that does not support the MDT.

Figure 8:
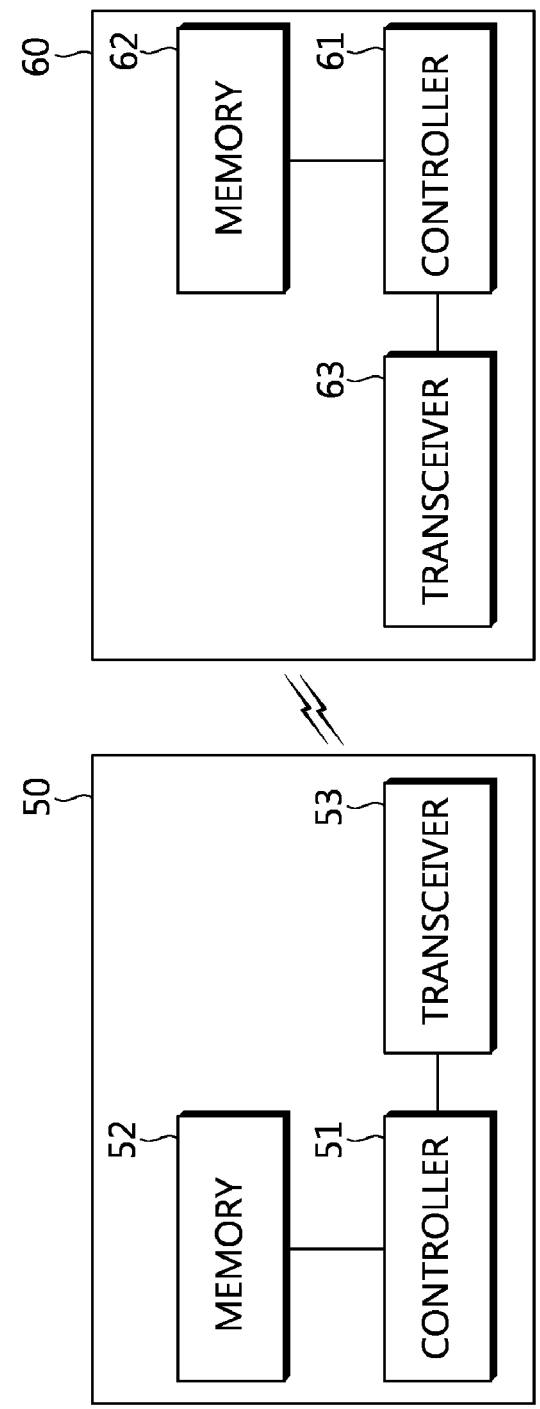
FIG. 8 is a block diagram showing a wireless communication system for implementing an embodiment of the present invention.

FIG. 8 is a block diagram showing a wireless communication system for implementing an embodiment of the present invention.

A BS 50 includes a controller 51, a memory 52, and a transceiver 53. The memory 52 is coupled to the controller 51, and stores a variety of information for driving the controller 51. The transceiver 53 is coupled to the processor 51, and transmits and/or receives data.

The controller 51 implements the proposed functions, processes and/or methods. The controller r 51 may perform MDT measurement according to the embodiments of FIGS. 6 and 7 or combinations thereof.

A UE 60 includes a controller 61, a memory 62, and a transceiver 63. The memory 62 is coupled to the controller 61, and stores a variety of information for driving the controller 61. The transceiver 63 is coupled to the processor 61, and transmits and/or receives data.

The controller 61 implements the proposed functions, processes and/or methods. The controller 61 may perform MDT measurement according to the embodiments of FIGS. 6 and 7 or combinations thereof.

A controller may implemented by a processor. The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A user equipment (UE) configured to perform measurements logging in a mobile communications system, comprising:
    a transceiver configured to transmit and receive data; and
    a controller operatively connected to the transceiver and configured to
        receive a first measurement request message from a first cell,
        receive a handover command message commanding the UE to handover from the first cell to a second cell,
        upon receiving the handover command message, stop a transmission of a response to the first measurement request message,
        perform handover from the first cell to the second cell,
        receive a second measurement request message from the second cell, and
        transmit a response to the second measurement request message,
    wherein the first measurement request message includes a first request for performing minimization of drive tests (MDT).

2. The UE of claim 1, wherein the second measurement request message includes a second request for performing minimization of drive tests (MDT).

3. The UE of claim 1, wherein the first measurement request message includes at least one of
    a logging interval indicating a periodicity for storing a measurement result,
    a reference time indicating when to send a logged measurement report, and
    an area configuration indicating an area for performing measurement logging.

4. The UE of claim 1, wherein the controller is configured to log a measurement after receiving the first measurement request message.

5. The UE of claim 4, wherein the measurement is logged in a radio resource control (RRC) idle mode.

6. A method of measuring by user equipment (UE) configured to perform measurements logging in a mobile communications system, the method comprising:
    receiving, by the UE, a first measurement request message from a first cell,
    receiving, by the UE, a handover command message, upon receiving the handover command message, stopping a transmission of a response by the UE to the first measurement request message performing, by the UE, handover from the first cell to a second cell, receiving, by the UE, a second measurement request message from the second cell, and transmitting, by the UE, a response to the second measurement request message, wherein the first measurement request message includes a first request for performing minimization of drive tests (MDT).

7. The method of claim 6, wherein the second measurement request message includes a second request for performing minimization of drive tests (MDT).

8. The method of claim 6, wherein the first measurement request message includes at least one of a logging interval indicating a periodicity for storing a measurement result, a reference time indicating when to send a logged measurement report, and an area configuration indicating an area for performing measurement logging.

9. The method of claim 6, further comprising:

logging a measurement after receiving the first measurement request message.

10. The method of claim 9, wherein the measurement is logged in a radio resource control (RRC) idle mode.

* * * * *